United States Patent [19]
Ueda

[11] Patent Number: 5,020,046
[45] Date of Patent: May 28, 1991

[54] APPARATUS FOR REPRODUCING RECORDED DATA FROM A DISC EMPLOYING VARIABLE REGENERATED CLOCK DELAY COMPENSATING FOR VARIABLE RECORDING CONDITIONS

[75] Inventor: Tadashi Ueda, Tokorozawa, Japan

[73] Assignee: Pioneer Electronic Corporation, Tokyo, Japan

[21] Appl. No.: 287,149

[22] Filed: Dec. 21, 1988

[30] Foreign Application Priority Data

Jun. 16, 1988 [JP] Japan ................................ 63-148915

[51] Int. Cl.$^5$ .............................................. G11B 7/00
[52] U.S. Cl. .......................................... 369/60; 369/59
[58] Field of Search ............. 369/32, 59, 44.11, 44.25, 369/44.26, 44.32, 47, 54–58, 109, 60; 360/73.01, 73.03; 358/320, 321, 322, 323, 342

[56] References Cited

U.S. PATENT DOCUMENTS

| | | | |
|---|---|---|---|
| 4,468,709 | 8/1984 | Kenjyo | 358/325 X |
| 4,628,497 | 12/1986 | Bierhoff | 369/50 X |
| 4,713,802 | 12/1987 | Kobata et al. | 369/59 |
| 4,908,811 | 3/1990 | Yokogawa et al. | 369/54 |

Primary Examiner—Robert L. Richardson
Attorney, Agent, or Firm—Fleit, Jacobson, Cohn, Price, Holman & Stern

[57] ABSTRACT

An apparatus for reproducing of data recorded on a disc type recording medium having alternatively a first region with previously recorded clock information and a second region with data information along the circumferential direction of the disc in the form of tracks. A clock signal re-generated on the basis of the clock information read from the recording medium is delayed by a preselected delay time during at least the reproducing period of the second region. Thus, the apparatus can operate stably regardless of the variations of the sensitivity of the disc and the recording condition such as intensity of the recording laser power or the like.

5 Claims, 2 Drawing Sheets

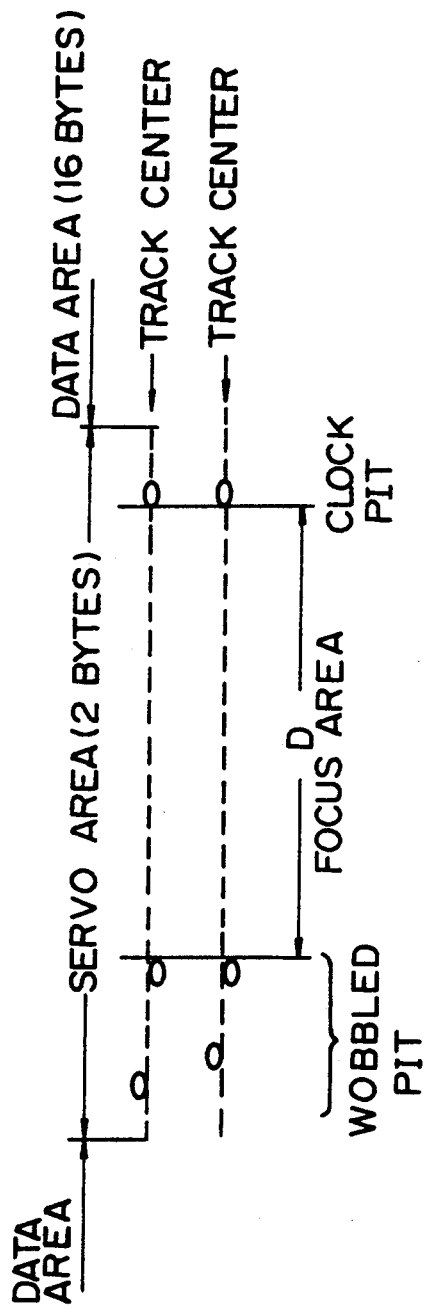
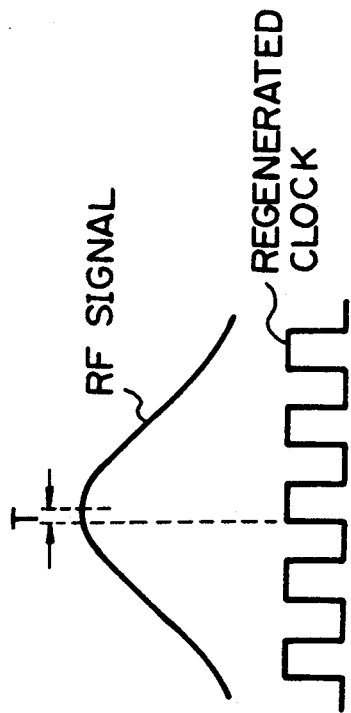
Fig. 1
Fig. 3(A)
Fig. 3(B)

APPARATUS FOR REPRODUCING RECORDED DATA FROM A DISC EMPLOYING VARIABLE REGENERATED CLOCK DELAY COMPENSATING FOR VARIABLE RECORDING CONDITIONS

BACKGROUND OF THE INVENTION

1. Field of the invention

The present invention relates to an apparatus for reproducing recorded data, and more particularly to an apparatus for reproducing data recorded on a disc type recording medium in the so-called sampled format.

2. Description of the Background Information

A disc which is written to once, such as the so-called DRAW (Direct Read After Write) disc carries, for example, thirty-two (32) sectors per one track. Each sector is made up of forty-three (43) servo blocks, and each servo block includes a servo area of two bytes and a data area of sixteen (16) bytes following the servo area. In each servo area two wobbled pits and one clock pit are previously formed as illustrated in FIG. 1. The wobbled pits are disposed on left and right sides of the track center, serving as a marker for the tracking servo operation. The position of the leading one of the wobbled pits is tangentially displaced from each other per sixteen (16) tracks. When the information detecting point of the pickup (a light spot for detecting information) moves on the track center, the decreases in quantity of light by the reflection at the left and right wobbled pits becomes equal, while decreases in quantity of the light at the left and right wobbled pits differs depending upon the direction and magnitude in deviation of the detecting point from the track center. Therefore, a tracking error signal can be generated from the difference between the decreased amounts (the difference between levels of RF signals) at two positions and this tracking error signal is held during the period of the succeeding data area.

As mentioned above, the distance between two adjacent wobbled pits varies at intervals of 16 tracks. By sensing the changes of the distance, it is possible even in a high-speed search mode to correctly count the number of tracks (this operation being designated 16-track counting).

Furthermore, the distance D between the trailing one of the two wobbled pits and a clock bit is set to a particular distance which does not appear in the data area. Therefore, the distance D can be detected as a synchronizing signal. Various timing signals are generated on the basis of the detected synchronizing signal. A clock signal is generated on the basis of a detection signal corresponding to the clock pits. The mirror portion between the pits extending through the distance D is used as a focus area during which a focus error signal is produced and the focus error signal is held during the period of the succeeding data area.

When a DRAW disc having a diameter of 5 inches with servo pits previously recorded thereon, for example, is rotated at 1800 rpm, the clock pulse signal generated in the RF signal due to the existence of the clock pits will have a repetition frequency of 41.28KHz.

Japanese Patent Application Laid-open No. P63-53760 specifically discloses an example of a recording and reproducing system which is arranged to record the data in the data areas, and to reproduce the recorded data while reading the address data and information data previously recorded on the DRAW disc following the servo area. This system is known as servo signal section.

When, in such a system, data is recorded on the DRAW disc, changes occur at the recording position of the data with respect to the servo area. This occurs at the prepit (hereinbefore referred to as the servo area) section of the disc because of variations in the sensibility of the material of the disc, and variations of the recording light power. When the recording position of data changes against the prepit section, the relation of the timing position between the clock pulse and the data section in the reproduced RF signal read from the disc is different from the time of recording. Thus, the error rate of the data becomes worse and the recorded data may not be stably reproduced.

OBJECT AND SUMMARY OF THE INVENTION

An object of the present invention is therefore to provide an apparatus for reproducing recorded data which is capable of performing a stable reproduction regardless of the variations of the sensitivity of the disc and the recording condition such as the recording laser power.

According to the present invention there is provided a data reproducing apparatus for reproducing the data recorded on a disc type recording medium having alternatively a servo region for containing previously recorded servo information and a data region for recording data along the circumferential direction thereof. The system of the present invention comprises clock generating means for generating a regenerated clock signal on the basis of the clock information read from the servo region, variable delay means for delaying the regenerated clock signal, and control means for changing a delay time of the variable delay means during at least the reproducing period of the data region.

BRIEF DESCRIPTION OF THE DRAWINGS

FIG. 1 is an explanatory diagram showing disposition of the servo area with respect to the data area in the so-called sampled format system;

FIGS. 3(a) and 3(b) are diagrams showing waveforms of a reproduced RF signal and a regenerated clock signal.

DETAILED DESCRIPTION OF A PREFERRED EMBODIMENT

Figure 2:
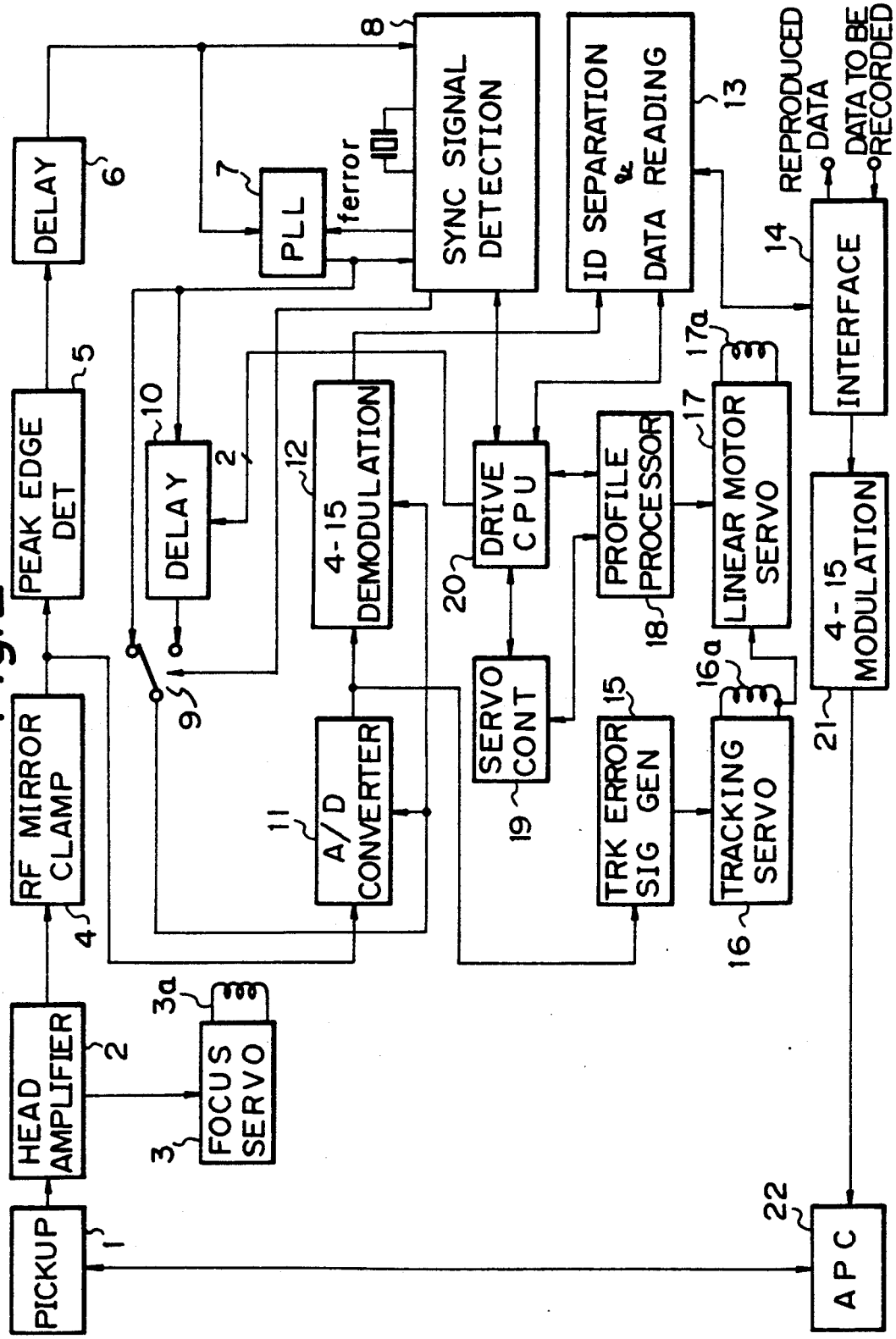
FIG. 2 is a block diagram showing an apparatus for reproducing recorded data according to the present invention.

An embodiment of the present invention will be explained hereinbelow with reference to FIG. 2. In FIG. 2, an output signal issued from a pickup 1 is supplied to a head amplifier 2 which in turn produces a focus error signal and an RF signal. The focus error signal is supplied to a focus servo circuit 3 which drives a focus actuator coil 3a of the pickup 1. The RF signal is supplied to a mirror clamp circuit 4 which clamps the level of the mirror portion of the RF signal at a predetermined level. The clamped RF signal is supplied to the peak edge detection circuit 5 which is adapted to differentiate the RF signal and to detect an edge of the differentiated RF signal to produce a pulse train which consists of edge pulses each occurring at each peak edge. The edge pulse produced from the peakedge detection circuit 5 is delayed by a predetermined delay time in a delay circuit 6 and then supplied to a PLL (Phase Locked Loop) circuit 7 and a sync signal detection circuit 8.

In the PLL circuit 7, a regenerated clock signal at, for example, 11.1456 MHz in synchronism with occurrences of the clock pits, is generated on the basis of the edge pulse passed through the delay circuit 6. The clock signal is supplied to the sync signal detection circuit 8. The sync signal detection circuit 8 is adapted to measure the interval between two successive pulses in the edge pulse train by, for example, counting the regenerated clock pulses, and to detect the sync signal and generate various sampling signals when the count value reaches a predetermined value. The regenerated clock signal generated in the PLL circuit 7 is supplied directly to one input terminal of a change-over switch 9 and to an other input terminal of the switch 9 after being delayed by a predetermined delay time in a delay circuit 10. The switch 9 is controlled by a control signal produced from the sync signal detection circuit 8 at a predetermined timing.

On the other hand, the clamped RF signal from the RF mirror clamp circuit 4 is also supplied to an A/D converter 11. In the A/D converter 11, the RF signal is sampled by each pulse of the regenerated clock signal, an the obtained sample value is successively converted into a corresponding digital data. The digital data from the A/D converter 11 is supplied to a 4-15 (4 out of 15) demodulation circuit 12. In the demodulation circuit 12, the demodulation of 4-15 modulated data is performed on the basis of the regenerated clock signal supplied from the switch 9. The demodulated data is supplied to an ID (identifier) separation and data reading circuit 13 which separates the ID data from the other information data. The ID data indicates the location of the respective sectors. A drive interface 14 produces the information data as reproducing data. The output data signal from the A/D converter 11 is also supplied to a tracking error signal generation circuit 15. Japanese Patent Application Laid-open No. P63-53760 previously designated, discloses in detail a method for generating the tracking error signal on the basis of the output data signal from the A/D converter 11. The tracking error signal is supplied to a tracking servo circuit 16 which performs fine control of the information detecting point of the pickup 1 in a radius direction of the disc against the recording track by driving a tracking coil 16a. A linear motor servo circuit 17 performs coarse control of the information detecting point in a radius direction of the disc against the recording track while energing a linear motor coil 17a. A control signal is supplied to the motor servo circuit 17 from a profile processor 18 which controls a seek operation. The various servo controls are governed by a servo controller 19 which is responsive to various commands from a drive CPU 20.

The drive CPU 20 determines the delay time of the delay circuit 10 as previously mentioned so as to reproduce and demodulate the read data. The delay circuit 10 consists of a delay wire, for example, which is adapted to change the delay time in 4 steps in response to a command of two bits from the drive CPU 20.

When data is to be recorded, the data to be recorded is supplied through the drive interface 14 to a APC (Automatic Power Control) circuit 22 after being 4-15 modulated in the 4-15 modulation circuit 21. Then, a drive power of a laser diode in the pickup 1 is controlled by the APC circuit 22 in response to a modulation signal. As a result, the data is recorded on a DRAW disc (not shown).

With the above described arrangement, the delay time of the delay circuit 6, is determined so that the A/D converting timing of the RF signal corresponds to the prepit section. Namely, the edges of the regenerated clock pulses as illustrated in FIG. 3(B) appear earlier than the maximum value of the RF signal corresponding to the clock pit illustrated in FIG. 3(A) by a period T for A/D converting, and the data is accurately demodulated.

When, on the other hand, data is recorded, as previously mentioned, the recording position of the data is subjected to change against the prepit on the disc because of variations in sensitivity of a material forming the recording layer of the disc and variations in the recording condition resulting from the variations of the laser power at the time of recording. According to the present invention, the regenerated clock signal generated in the PLL circuit 7 is directly supplied to the A/D converter 11 for further processing during the reproduction period for the prepit section. During the reproduction period for the data area, the regenerated clock is supplied after being delayed by a predetermined delay time in the delay circuit 10 by the change-over operation of the switch 9, to the A/D converter 11 and the 4-15 demodulation circuit 12. The sync signal detection circuit 8 is adapted to detect the reproduction period of the prepit section and the reproduction period of the data area by counting the number of the regenerated clocks appearing after each sync signal, and to generate the control signal against the change-over switch 9 in accordance with the result of the detection. The delay time of the delay circuit 10 is so determined by the drive CPU 20 so that the read data is correctly reproduced and demodulated. Some disc information such as the sensitivity of the disc and the recording condition resulting from the strength of the laser power at the time of recording may be previously memorized in the control track of every disc, and the delay times of the delay circuit 10 may be determined by the drive CPU 20 on the basis of the disc information obtained from the control track, during playback of the disc.

As described in the foregoing, the regenerated clock is delayed by a preselected delay time during the reproducing period of the data section.

It is to be understood that the application of the delay time may be unnecessary in the case when the position of the data pits are correct with respect to the prepit area.

It is now apparent that the variation can be corrected by the delay of the regenerated clock during the reproducing period of the data even if the recording position of the data changes against the prepit section during the recording period of the data for the difference of various conditions of a disc. Thus, the apparatus according to the present invention can perform stable reproducing regardless of the difference of the recording condition.

In the embodiment described above, the delay circuit 10 and the change-over switch 9 are disposed in a succeeding stage of the PLL circuit 7. However, the circuit 10 and the switch 9 may be disposed between the delay circuit 6 and the PLL circuit 7.

The delay circuit 10 consists of the delay wire in the embodiment. However, this need not be the case, so long as a desired delay time can be obtained. Furthermore, although the delay time is variable in four steps by two bits in the embodiment, the delay time may be changed by steps greater than or less than four steps.

It will be apparent from the foregoing that the delay time for the regenerated clock is changed at the reproducing period of the recorded data section in the recorded data reproducing apparatus according to the present invention. Thus, the apparatus can perform a stable reproduction operation regardless of the variations of the sensitivity of the disc, the recording condition resulting from the recording laser power or the like.

In the embodiment mentioned above, the delay is applied to the regenerated clock signal only during the reproduction period of data information. However, some delay may be applied to the regenerated clock signal during the reproduction period of the servo information if desired.

I claim:

1. An apparatus for reproducing data recorded on an information recording disc having alternately a first region with pre-recorded clock information and a second region with data information along the circumferential direction of said disc in the form of tracks, the apparatus comprising:

clock generating means for generating a clock signal comprising a train of clock pulses on the basis of said clock information read from said recording disc;

variable delay means for delaying said clock signal by a variable delay time; and control means for changing the variable delay time of said variable delay means during at least a reproduction period of data from said second region of said information recording disc.

2. A recorded data reproducing apparatus as set forth in claim 1, wherein said control means is adapted to detect a predetermined section as a sync signal in said first region on the basis of said clock information, to count said clock pulses appearing after said sync signal, and to determine a reproduction period of data from said first region with respect to the reproduction period of said second region in accordance with the count value.

3. A recorded data reproducing apparatus as set forth in claim 1, wherein said variable delay means is adapted to change said variable delay time from zero to a finite value in accordance with information obtained from said recording disc.

4. A recorded data reproducing apparatus as set forth in claim 1, wherein said delay time is predetermined in accordance with the material forming the recording layer of said disc.

5. A recorded data reproducing apparatus as set forth in claim 1, wherein said disc is an optical disc and said delay time is predetermined in accordance with the intensity of the recording light beam.

* * * * *